US012565217B2

(12) United States Patent (10) Patent No.: US 12,565,217 B2
Ozog et al. (45) Date of Patent: Mar. 3, 2026

(54) SYSTEMS AND METHODS FOR CROSS SLOPE BIAS ESTIMATION

(71) Applicant: Woven by Toyota, Inc., Tokyo (JP)

(72) Inventors: Paul J. Ozog, Ann Arbor, MI (US); Yucong Lin, Ann Arbor, MI (US)

(73) Assignee: Woven by Toyota, Inc., Tokyo (JP)

( * ) Notice: Subject to any disclaimer, the term of this patent is extended or adjusted under 35 U.S.C. 154(b) by 191 days.

(21) Appl. No.: 18/240,924

(22) Filed: Aug. 31, 2023

(65) Prior Publication Data

US 2025/0074429 A1 Mar. 6, 2025

(51) Int. Cl.
*B60W 40/02* (2006.01)
*B60W 40/076* (2012.01)

(52) U.S. Cl.
CPC ................................. *B60W 40/076* (2013.01)

(58) Field of Classification Search
USPC ............................... 701/1, 23–28, 65, 70–80
See application file for complete search history.

(56) References Cited

U.S. PATENT DOCUMENTS

| | | | | |
|---|---|---|---|---|
| 9,870,624 B1 * | 1/2018 | Narang | ...................... | G06T 7/74 |
| 11,436,743 B2 * | 9/2022 | Guizilini | .............. | G06N 3/0455 |
| 11,898,853 B2 * | 2/2024 | Xie | .......................... | G01C 21/32 |
| 11,899,114 B1 * | 2/2024 | Kroeger | ................ | G01S 17/931 |
| 2015/0127239 A1 * | 5/2015 | Breed | ..................... | G01S 19/13 |
| | | | | 701/70 |

| | | | | |
|---|---|---|---|---|
| 2016/0154408 A1 * | 6/2016 | Eade | ....................... | G06F 16/24 |
| | | | | 701/523 |
| 2017/0123421 A1 * | 5/2017 | Kentley | ................. | G05D 1/695 |
| 2018/0373941 A1 * | 12/2018 | Kwant | ................. | G08G 1/0145 |
| 2020/0018607 A1 * | 1/2020 | Balu | ....................... | H04W 12/02 |
| 2020/0033463 A1 * | 1/2020 | Lee | ........................... | G01S 11/06 |
| 2020/0306969 A1 * | 10/2020 | Bryner | .................. | G01N 29/28 |
| 2022/0198935 A1 * | 6/2022 | Adams | ............... | B60W 60/001 |
| 2022/0281456 A1 * | 9/2022 | Giovanardi | .......... | G08G 1/0112 |
| 2023/0016578 A1 * | 1/2023 | Williams | .......... | G01C 21/3863 |
| 2023/0117253 A1 * | 4/2023 | Molad | ....................... | G06T 7/20 |
| | | | | 382/103 |
| 2023/0135234 A1 * | 5/2023 | Wang | .................... | G06V 10/774 |
| | | | | 382/103 |
| 2023/0258457 A1 * | 8/2023 | Jiang | .................... | G08G 1/0141 |
| | | | | 701/446 |
| 2023/0391374 A1 * | 12/2023 | Chen | ..................... | G06N 3/0464 |
| 2025/0065894 A1 * | 2/2025 | Luo | ................... | B60W 50/0205 |

FOREIGN PATENT DOCUMENTS

| | | |
|---|---|---|
| CN | 108717712 A | 10/2018 |
| CN | 112985416 A | 6/2021 |
| CN | 115265560 A | 11/2022 |
| GB | 2599948 A | 4/2022 |
| JP | 2020067439 A | 4/2020 |
| WO | 2022079292 A1 | 4/2022 |

* cited by examiner

*Primary Examiner* — Jonathan L Sample
(74) *Attorney, Agent, or Firm* — Christopher G. Darrow; Darrow Mustafa PC

(57) ABSTRACT

System, methods, and other embodiments described herein relate to implementing surface bias estimation strategies. In one embodiment, a method includes processing probe trace data with a factor graph having nodes and factors that describe an estimate of surface bias; and correcting the probe trace data based on the estimate of surface bias.

20 Claims, 5 Drawing Sheets

SYSTEMS AND METHODS FOR CROSS SLOPE BIAS ESTIMATION

TECHNICAL FIELD

The subject matter described herein relates, in general, to estimating a 3D bias induced by utilizing a flat ground plane assumption in keypoint location estimation and, more particularly, to correcting such a bias where roads are cross sloped.

BACKGROUND

Water that flows or collects on a road surface can damage not only the road surface but also the road base materials underneath. In order to minimize the presence of surface water on the road, road surfaces are typically implemented with cross sloping. For example, a road may have a centerline crown where the road slopes downward (e.g., ½" for every 12") away from the centerline, such that surface water is directed to a drainage channel on either side of the road. In some contexts, such as where a road is cut into a hill or where vehicle speeds will require a banked curve, a road may be designed with in-sloping or out-sloping instead of a centerline crown. With respect to in-sloping, the road is sloped downwards (as perceived from a cross-section of the road) toward the up-slope side of the road (e.g., the higher side of a sidehill cut). When a road is designed with an in-slope, the surface water typically flows into a drainage channel between the road and the up-slope side. With respect to out-sloping, the road is sloped downwards (as perceived from a cross-section of the road) toward the down-slope side of the road (e.g., the drop-off side of a sidehill cut). When a road is designed with an out-slope, the surface water typically flows off into the down-slope side, in which a drainage channel may or may not be present. With respect to the slope angle of roads, paved roads are typically laid at a cross-slope of 2% (e.g., ½" for every 12"), while unpaved roads, due to their higher susceptibility to water penetration damage, are typically laid at a cross-slope of 4 to 6%.

SUMMARY

In one embodiment, a surface bias estimation system is disclosed. The surface bias estimation system includes one or more processors and a memory communicably coupled to the one or more processors. The memory stores a command module including instructions that when executed by the one or more processors cause the one or more processors to process probe trace data with a factor graph having nodes and factors that describe an estimate of surface bias; and correct the probe trace data based on the estimate of surface bias.

In one embodiment, a non-transitory computer-readable medium including instructions that when executed by one or more processors cause the one or more processors to perform one or more functions is disclosed. The instructions include instructions to process probe trace data with a factor graph having nodes and factors that describe an estimate of surface bias; and correct the probe trace data based on the estimate of surface bias.

In one embodiment, a method for implementing surface bias estimation strategies for connected autonomous vehicles is disclosed. In one embodiment, the method includes processing probe trace data with a factor graph having nodes and factors that describe an estimate of surface bias; and correcting the probe trace data based on the estimate of surface bias.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with implementing surface bias estimation strategies for vehicles are disclosed herein. Roads are often presumed to constitute a flat-ground plane when performing visual measurements with a visual Simultaneous Localization and Mapping (SLAM) system. However, in order to eliminate water from the road surface, most roads exhibit some degree of cross-slope. Accordingly, the further an object is measured from the side of a vehicle, the more likely that cross-slope will result in an erroneous measurement of the object. For example, out-sloping will result in a measurement of an object closer than it actually is if a flat-ground plane is assumed.

In order to correct such measurements, factor graphs are described herein that receive probe trace data, such as image frames containing keypoints and odometry data, after which the factor graphs may be optimized to determine an estimate of surface bias. Once the estimate of surface bias is known, the probe trace data can be corrected to more accurately represent the location of objects. Thereafter, the corrected probe trace data may then be used to update a vehicle or server, such as for the purpose of displaying the corrected probe trace data in a map.

Figure 1:
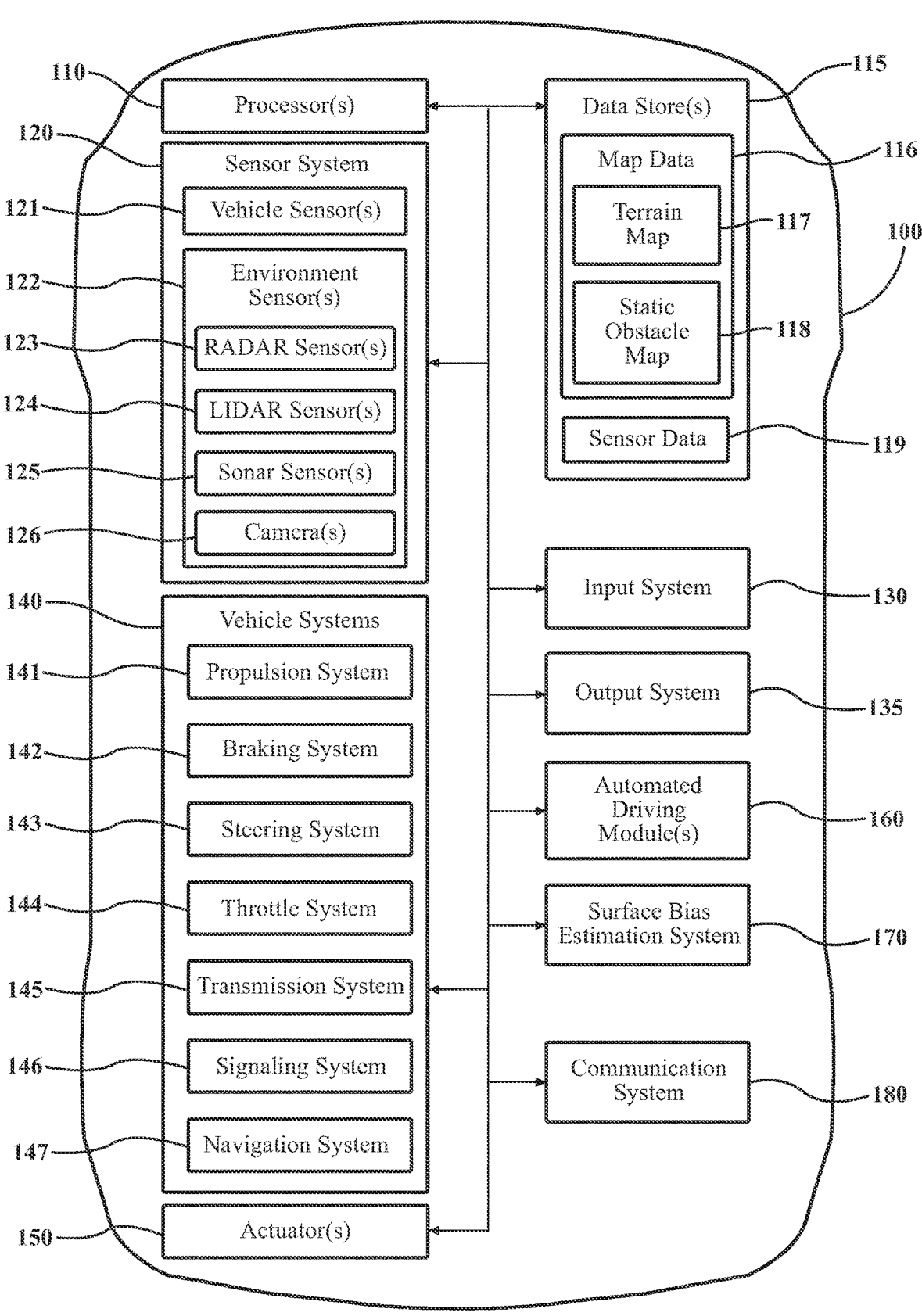
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, vehicle 100 is an automobile. While arrangements will be described herein with respect to automobiles, it will be understood that embodiments are not limited to automobiles. In some implementations, vehicle 100 may be any robotic device or form of motorized transport that, for example, includes sensors to perceive aspects of the surrounding environment, and thus benefits from the functionality discussed herein associated with surface bias estimation strategies. As a further note, this disclosure generally discusses vehicle 100 as traveling on a roadway with surrounding vehicles, which are intended to be construed in a similar manner as vehicle 100 itself. That is, the surrounding vehicles may include any vehicle that may be encountered on a roadway by vehicle 100.

Vehicle 100 also includes various elements. It will be understood that in various embodiments it may not be necessary for vehicle 100 to have all of the elements shown in FIG. 1. Vehicle 100 may have any combination of the various elements shown in FIG. 1. Further, vehicle 100 may have additional elements to those shown in FIG. 1. In some arrangements, vehicle 100 may be implemented without one or more of the elements shown in FIG. 1. While the various elements are shown as being located within vehicle 100 in FIG. 1, it will be understood that one or more of these elements may be located external to vehicle 100. Further, the elements shown may be physically separated by large distances. For example, as discussed, one or more components of the disclosed system may be implemented within a vehicle while further components of the system are implemented within a cloud-computing environment or other system that is remote from vehicle 100.

Some of the possible elements of vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, vehicle 100 includes a surface bias estimation system 170 that is implemented to perform methods and other functions as disclosed herein relating to implementing surface bias estimation strategies. As will be discussed in greater detail subsequently, surface bias estimation system 170, in various embodiments, is implemented partially within vehicle 100 and as a cloud-based service. For example, in one approach, functionality associated with at least one module of surface bias estimation system 170 is implemented within vehicle 100 while further functionality is implemented within a cloud-based computing system.

Figure 2:
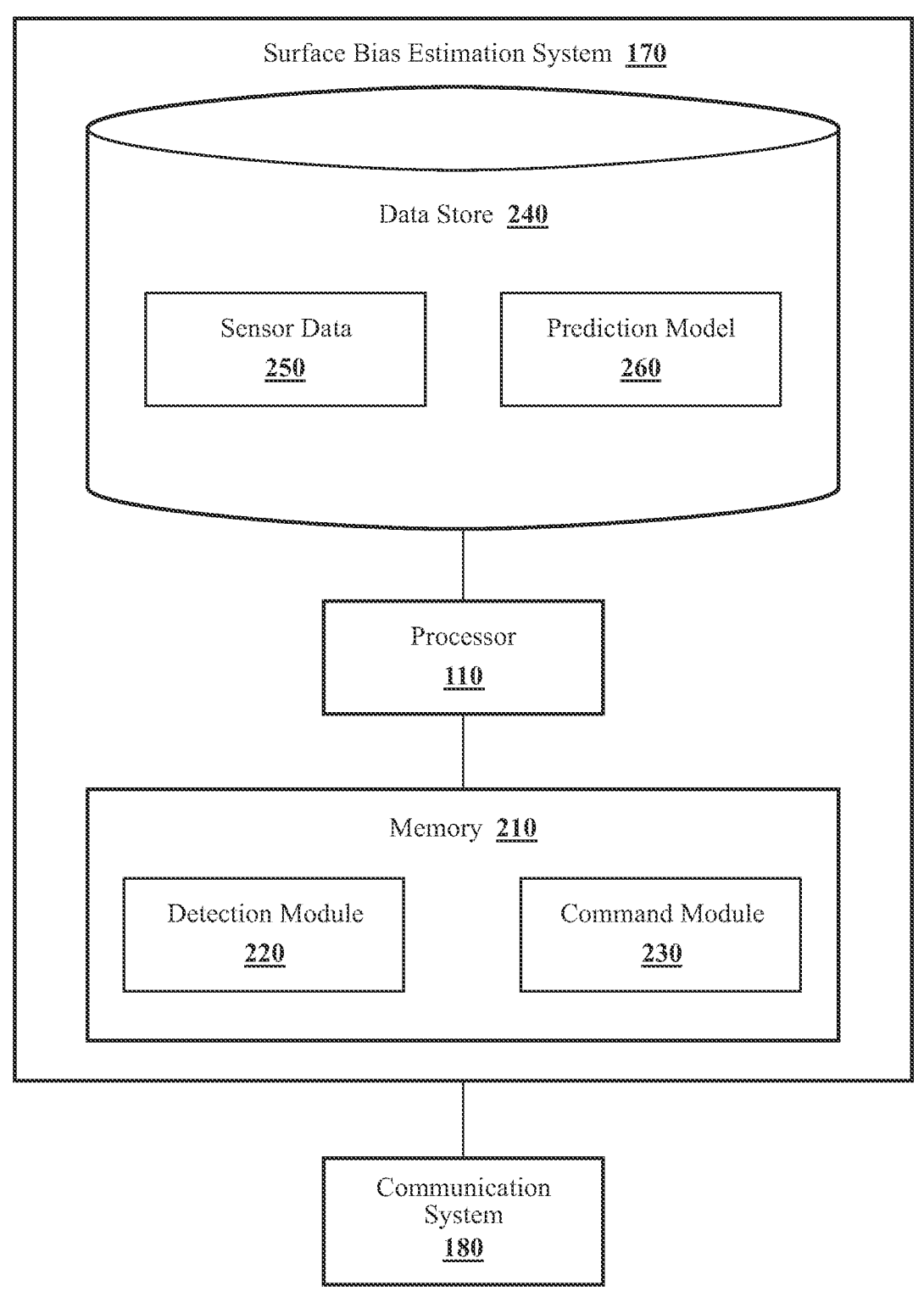
FIG. 2 illustrates one embodiment of a surface bias estimation system that is associated with implementing surface bias estimation strategies.

With reference to FIG. 2, one embodiment of surface bias estimation system 170 of FIG. 1 is further illustrated. Surface bias estimation system 170 is shown as including a processor(s) 110 from vehicle 100 of FIG. 1. Accordingly, processor(s) 110 may be a part of surface bias estimation system 170, surface bias estimation system 170 may include a separate processor from processor 110(*s*) of vehicle 100, or surface bias estimation system 170 may access processor 110(*s*) through a data bus or another communication path. In one embodiment, surface bias estimation system 170 includes memory 210, which stores detection module 220 and command module 230. Memory 210 is a random-access memory (RAM), read-only memory (ROM), a hard-disk drive, a flash memory, or other suitable memory for storing detection module 220 and command module 230. Detection module 220 and command module 230 are, for example, computer-readable instructions that when executed by processor(s) 110 cause processor(s) 110 to perform the various functions disclosed herein.

Figure 3:
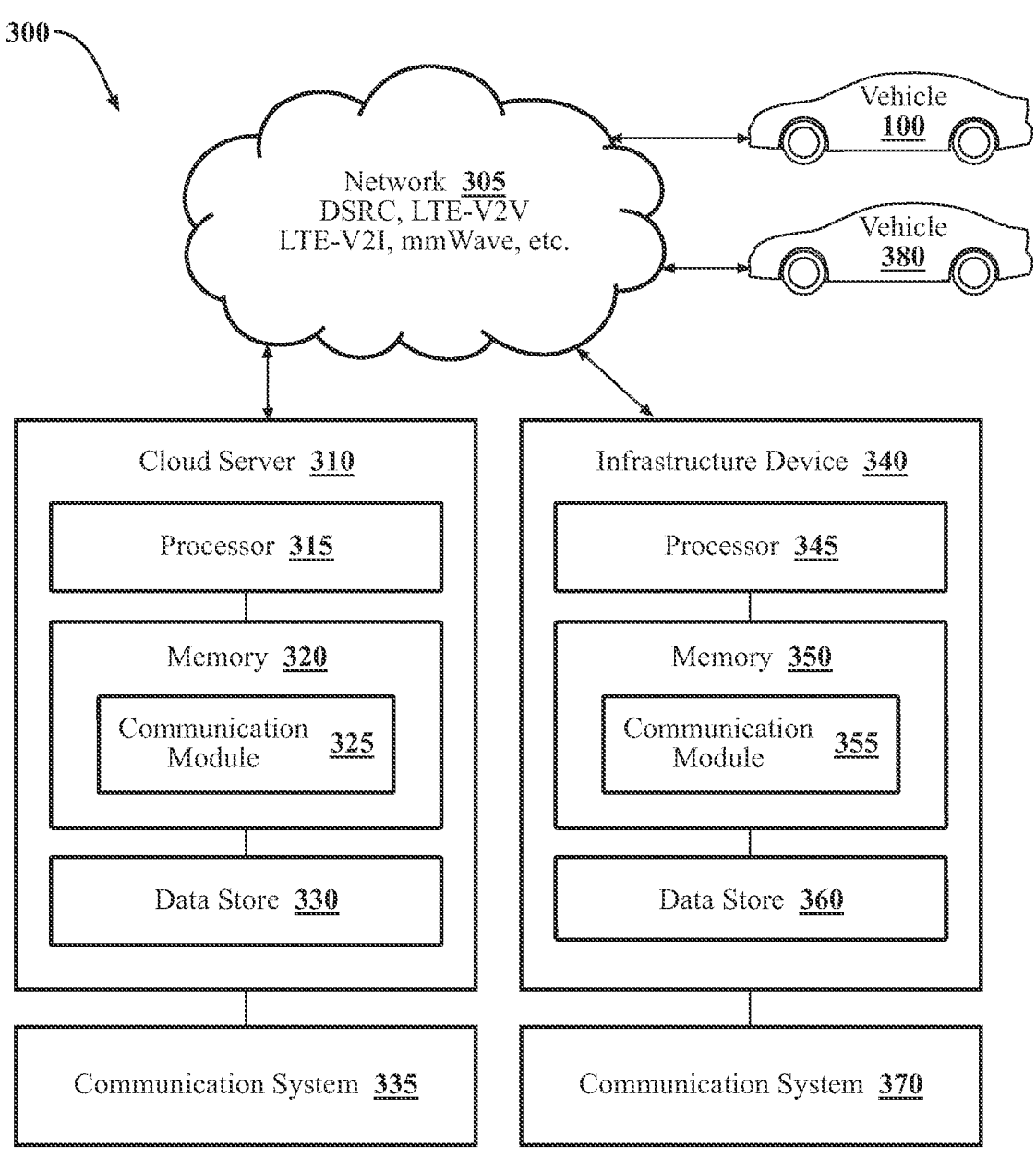
FIG. 3 illustrates one embodiment of the surface bias estimation system of FIG. 2 in a cloud-computing environment.

Surface bias estimation system 170 as illustrated in FIG. 2 is generally an abstracted form of surface bias estimation system 170 as may be implemented between vehicle 100 and a cloud-computing environment. FIG. 3, which is further described below, illustrates one example of a cloud-computing environment 300 that may be implemented along with surface bias estimation system 170. As illustrated in FIG. 3, surface bias estimation system 170 may be embodied at least in part within cloud-computing environment 300.

With reference to FIG. 2, detection module 220 generally includes instructions that function to control processor(s) 110 to receive data inputs from one or more sensors of vehicle 100. The inputs are, in one embodiment, observations of one or more objects in an environment proximate to vehicle 100, other aspects about the surroundings, or both. As provided for herein, detection module 220, in one embodiment, acquires sensor data 250 that includes at least camera images. In further arrangements, detection module 220 acquires sensor data 250 from further sensors such as radar 123, LiDAR 124, and other sensors as may be suitable for identifying vehicles, locations of the vehicles, or vehicle-related disturbances (e.g., debris, water spray). In one embodiment, detection module 220 may also acquire sensor data 250 from one or more sensors, such as vehicle poses, keypoint locations, camera images, depth maps, point cloud data, uncertainty estimates, map representations, or other data as may be generated by a SLAM system. In various embodiments, detection module 220 may provide a SLAM system in conjunction with one or more sensors of vehicle 100, while in other embodiments a SLAM system may be communicatively coupled to provide such information to detection module 220.

Accordingly, detection module 220, in one embodiment, controls the respective sensors to provide sensor data 250. Additionally, while detection module 220 is discussed as controlling the various sensors to provide sensor data 250, in one or more embodiments, detection module 220 may employ other techniques to acquire sensor data 250 that are either active or passive. For example, detection module 220 may passively sniff sensor data 250 from a stream of electronic information provided by the various sensors to further components within vehicle 100. Moreover, detection module 220 may undertake various approaches to fuse data from multiple sensors when providing sensor data 250, from sensor data acquired over a wireless communication link (e.g., v2v) from one or more of the surrounding vehicles, or from a combination thereof. Thus, sensor data 250, in one embodiment, represents a combination of perceptions acquired from multiple sensors.

In addition to locations of surrounding vehicles, sensor data 250 may also include, for example, information about odometry data, lane markings, keypoint locations, or other SLAM data that may assist in implementing bias estimation strategies. Moreover, detection module 220, in one embodiment, controls the sensors to acquire sensor data about an area that encompasses 360 degrees about vehicle 100, which may then be stored in sensor data 250. In some embodiments, such area sensor data may be used to provide a comprehensive assessment of the surrounding environment around vehicle 100. Of course, in alternative embodiments, detection module 220 may acquire the sensor data about a forward direction alone when, for example, vehicle 100 is not equipped with further sensors to include additional regions about the vehicle or the additional regions are not scanned due to other reasons (e.g., unnecessary due to known current conditions).

Moreover, in one embodiment, surface bias estimation system 170 includes a database 240. Database 240 is, in one embodiment, an electronic data structure stored in memory 210 or another data store and that is configured with routines that may be executed by processor(s) 110 for analyzing stored data, providing stored data, organizing stored data, and so on. Thus, in one embodiment, database 240 stores data used by the detection module 220 and command module 230 in executing various functions. In one embodiment, database 240 includes sensor data 250 along with, for example, metadata that characterize various aspects of sensor data 250. For example, the metadata may include location coordinates (e.g., longitude and latitude), relative map coordinates or tile identifiers, time/date stamps from when separate sensor data 250 was generated, and so on.

Detection module 220, in one embodiment, is further configured to perform additional tasks beyond controlling the respective sensors to acquire and provide sensor data 250. For example, detection module 220 includes instructions that may cause processor(s) 110 to form probe traces based on sensor data 250. A probe trace based on SLAM data may contain a sequence of poses (e.g., positions and orientations) that a vehicle traverses over time; a timestamp associated with each pose that establishes a temporal order of the poses; odometry data, such as from internal motion sensing capabilities of detection module 220; uncertainty measurements (e.g., a measure of the SLAM system's confidence in a vehicle pose); or other measurements such as keypoint locations. For example, if vehicle 100 travels down a highway for twenty miles, detection module 220 may construct probe data covering that length in which individual instances of image frames, vehicle pose, and keypoint locations are synchronized together in a temporal sequence. To the extent data being used to generate a probe trace is not synchronized (e.g., due to being generated by different components of vehicle 100), detection module 220 may use techniques well-known in the art to synchronize such data within the probe trace (e.g., interpolation, curve-fitting).

In one embodiment, command module 230 generally includes instructions that function to control the processor(s) 110 or collection of processors in the cloud-computing environment 300 as shown in FIG. 3 for implementing surface bias estimation strategies.

With reference to FIG. 3, vehicle 100 may be connected to a network 305, which allows for communication between vehicle 100 and cloud servers (e.g., cloud server 310), infrastructure devices (e.g., infrastructure device 340), other vehicles (e.g., vehicle 380), and any other systems connected to network 305. With respect to network 305, such a network may use any form of communication or networking to exchange data, including but not limited to the Internet, Directed Short Range Communication (DSRC) service, LTE, 5G, millimeter wave (mmWave) communications, and so on.

Cloud server 310 is shown as including a processor 315 that may be a part of surface bias estimation system 170 through network 305 via communication unit 335. In one embodiment, cloud server 310 includes a memory 320 that stores a communication module 325. Memory 320 is a random-access memory (RAM), read-only memory (ROM), a hard-disk drive, a flash memory, or other suitable memory for storing communication module 325. Communication module 325 is, for example, computer-readable instructions that when executed by processor 315 causes processor 315 to perform the various functions disclosed herein. Moreover, in one embodiment, cloud server 310 includes database 330. Database 330 is, in one embodiment, an electronic data structure stored in a memory 320 or another data store and that is configured with routines that may be executed by processor 315 for analyzing stored data, providing stored data, organizing stored data, and so on.

Infrastructure device 340 is shown as including a processor 345 that may be a part of surface bias estimation system 170 through network 305 via communication unit 370. In one embodiment, infrastructure device 340 includes a memory 350 that stores a communication module 355. Memory 350 is a random-access memory (RAM), read-only memory (ROM), a hard-disk drive, a flash memory, or other suitable memory for storing communication module 355. Communication module 355 is, for example, computer-readable instructions that when executed by processor 345 causes processor 345 to perform the various functions disclosed herein. Moreover, in one embodiment, infrastructure device 340 includes a database 360. Database 360 is, in one embodiment, an electronic data structure stored in memory 350 or another data store and that is configured with routines that may be executed by processor 345 for analyzing stored data, providing stored data, organizing stored data, and so on.

Accordingly, in addition to information obtained from sensor data 250, surface bias estimation system 170 may obtain information from cloud servers (e.g., cloud server 310), infrastructure devices (e.g., infrastructure device 340), other vehicles (e.g., vehicle 380), and any other systems connected to network 305. For example, cloud servers (e.g., cloud server 310) may be used to perform the same tasks as described herein with respect to command module 230. For instance, probe trace data may be collected by vehicle 100 and sent to cloud server 310, where the probe trace data may be analyzed and corrected using a factor graph as described herein.

In some embodiments, command module 230 may receive probe trace data. For example, it may receive probe trace data via sensor data 250 or from cloud-computing environment 300 via communication system 180. Upon receiving the probe trace data, command module 230 may search for a series of keypoints that can be interpreted as forming a line that is parallel to a vehicle's trajectory. For example, as vehicle 100 drives in a lane, lane markers may cause sensors of vehicle 100 to generate keypoints that are consistently at a distance parallel to the vehicle. Techniques, such as association heuristics, may be used by command module 230 to determine a series of keypoints. Once such a series of keypoints is identified, command module 230 may then generate a truncated probe segment, which incorporates some or all of the probe trace data representing a sequence of keypoints parallel to vehicle. In this manner, command module 230 may generate probe segments from the probe data that avoid situations such as lane changes, lane mergers, or other situations where road surfaces or markers are moving closer to or away from the vehicle, rather than parallel to the vehicle. In various aspects, a series of keypoints may describe a sequence arising from features other than lane markers, such as curbs, rumble strips, and so on that also tend to repeat alongside a vehicle's path of travel.

Figure 4:
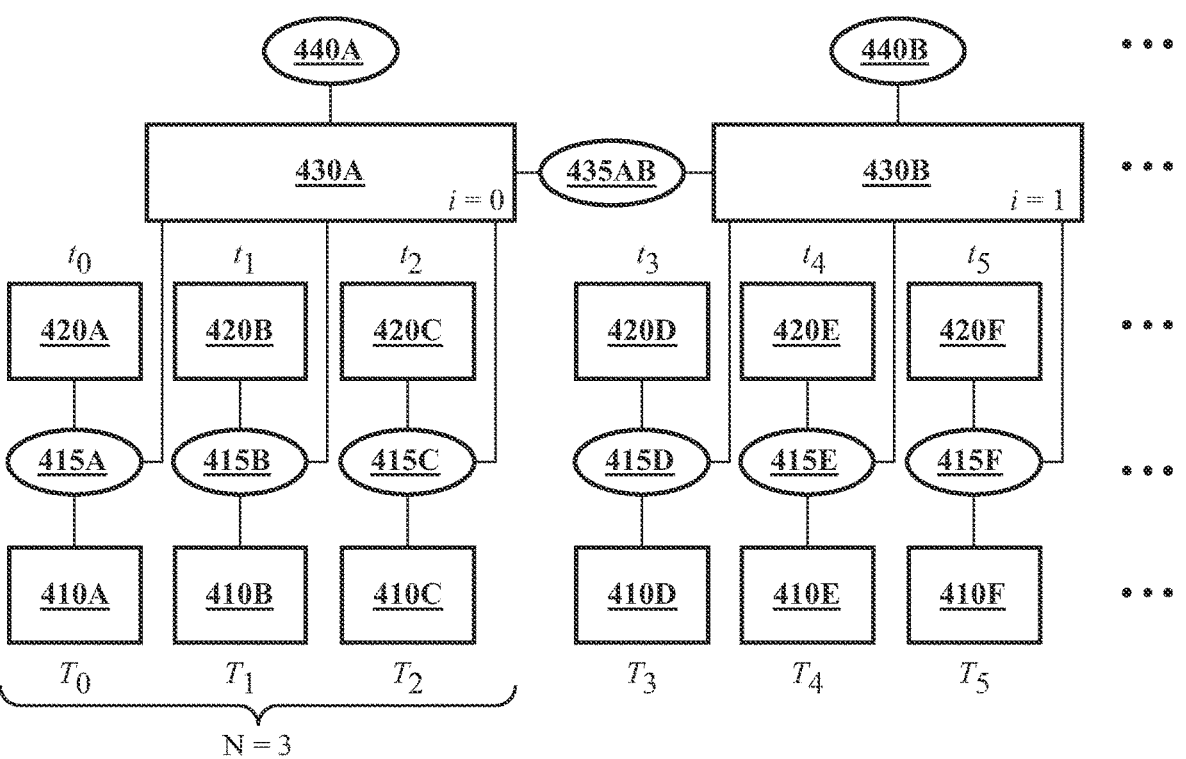
FIG. 4 illustrates one example of a factor graph for estimating surface bias.

In some embodiments, command module 230 may initialize a factor graph as shown in FIG. 4 based on a probe segment and a tunable bias parameter (which may either be pre-determined or selected via command module 230). For example, as shown in FIG. 4, command module 230 may first generate a sequence of pose nodes 410A, 410B, 410C,

410D, 410E, 410F, and so on based on vehicle position data within the probe segment. In some embodiments, each pose node in the sequence of pose nodes may be initialized with 3D translation data and 3D rotation data from the visual odometry within the probe segment. For example, a pose node may be initialized with six degrees of freedom (6DOF) coordinate data $(X_i, Y_i, Z_i, \phi_i, \theta_i, \psi_i)$ at $T_i$, where $X_i$ is the translational movement of the camera or vehicle along the x-axis at time $T_i$, $Y_i$ is the translational movement of the camera or vehicle along the y-axis at time $T_i$, $Z_i$ is the translational movement of the camera or vehicle along the z-axis at time $T_i$, $\phi_i$ is the rotational movement of the camera or vehicle around the x-axis at time $T_i$, $\theta_i$ is the rotational movement of the camera or vehicle around the y-axis at time $T_i$, $\psi_i$ is the rotational movement of the camera or vehicle around the z-axis at time $T_i$. Accordingly, for pose nodes 410A to 410n, pose node 410A may be initialized with 6DOF coordinate data at $T_0$, pose node 410B may be initialized with 6DOF coordinate data at $T_1$, and so on, where $T_0 < T_1 < \ldots < T_n$. While the preceding example utilizes six degrees of freedom (6DOF) coordinate data, any coordinate data for determining the location/pose of a vehicle (or a camera) may be used to initialize the pose nodes.

Next, as shown in FIG. 4, command module 230 may generate a sequence of point nodes 420A, 420B, 420C, 420D, 420E, 420F, and so on based on keypoint data within the probe segment. In some embodiments, each point node in the sequence of point nodes may be initialized with keypoint location data from the probe sensor data within the probe segment. For example, a point node may be initialized with keypoint location values $(x_i, y_i, z_i)$ at $t_i$, where $x_i$ is the location along the x-axis of an observed keypoint at time $t_i$, $y_i$ is the location along the y-axis of the observed keypoint at time $t_i$, and $z_i$ is the location along the z-axis of the observed keypoint at time $t_i$. Accordingly, for point nodes 420A to 420n, point node 420A may be initialized with keypoint location values at to, point node 420B may be initialized with keypoint location values at $t_1$, and so on, where $t_0 < t_1 < \ldots < t_n$. In some embodiments, keypoint location values $(x_i, y_i, z_i)$ at $t_i$ may represent points associated with a curb edge. In some embodiments, keypoint location values $(x_i, y_i, z_i)$ at $t_i$ may represent points associated with a sequence of lane markers. In some embodiments, $t_i$ may be the same as $T_i$. In other embodiments, $t_i$ and $T_i$ may be approximately equal to each other with a pre-determined tolerance (e.g., 20 ms).

In some embodiments, a tunable bias parameter may be selected. Based on the selection of a tunable bias parameter (represented as having a value of N herein), a sequence of bias nodes 430A, 430B, and so on may be generated by command module 230, where each bias node is connected by N pose-point-bias factors to N successive pairs of pose nodes and point nodes. For example, if N is equal to 3 as shown in FIG. 4, then bias node 430A will be connected by pose-point-bias factor 415A to pose node 410A and point node 420A, by pose-point-bias factor 415B to pose node 410B and point node 420B, and by pose-point-bias factor 415C to pose node 410C and point node 420C; bias node 430B will be connected by pose-point-bias factor 415D to pose node 410D and point node 420D, by pose-point-bias factor 415E to pose node 410E and point node 420E, and by pose-point-bias factor 415F to pose node 410F and point node 420F; and so on for each additional bias node. In some embodiments, a sequence of bias nodes may be generated until no more N successive pairs of pose nodes and point nodes can be connected to a bias node. In some embodiments, if any successive pairs of pose nodes and point nodes cannot be connected to a bias node (e.g., because the number of successive pairs is less than N), such pose nodes and point nodes may be ignored, deleted, or truncated.

Each bias node may be initialized with a floating-point number, which for example may be set to zero or a value specified by a function based on one or more keypoint location values. For example, as shown in FIG. 5, given a lateral keypoint location value along the y-axis (as shown by l) and the height of the camera (as shown by h), a line connecting the camera to the keypoint may be given by the equation $$z_1(y) = -\frac{h}{l}y + h.$$

Figure 5:
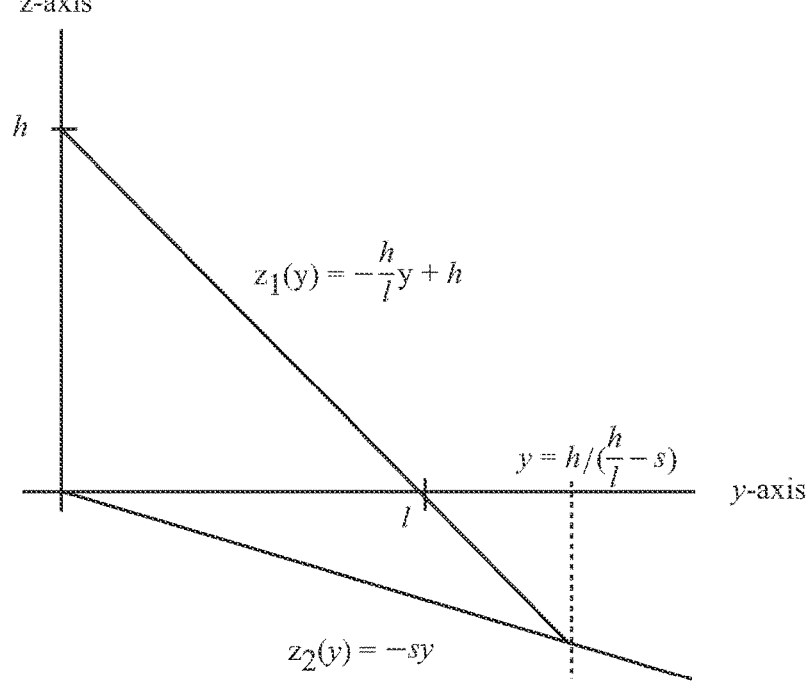
FIG. 5 illustrates one example of determining an initial value of a bias node.

In addition, as shown in FIG. 5 a second line representing the cross-grade may be assumed to have the equation $z_2(y)=-sy$ where s specifies the grade of the cross slope (e.g., ½" per 12"). Based on $z_1(y)$ and $z_2(y)$, the point at which these two lines intersect on the y-axis may be given by $$y = h \Big/ \left(\frac{h}{l} - s\right).$$

Accordingly, given a lateral keypoint location value of l (such as where the value is obtained from one point node connected to a bias node or by averaging across multiple point nodes connected to a bias node), the bias node may be initialized with a value of $$l - h \Big/ \left(\frac{h}{l} - s\right).$$

For instance, if h has a value of 60, l has a value of 36, and s has a value of $\frac{1}{12}$, then the two lines described above intersect where y=37.89474 and the initial value of the bias node can be set to −1.89474. In various embodiments, the value of s may be selected based on road type, road geometry, other observable road characteristics, or a combination thereof. In other embodiments, an estimate of s may be obtained via odometry data (e.g., based on a moving average of $\phi_i$ or other pose data). In some embodiments, other functions (e.g., a pre-determined linear function based on value(s) of one or more point nodes connected to a bias node) may be used to initialize a bias node.

With respect to the pose-point-bias factors connecting successive pairs of pose nodes and point nodes to a bias node, each pose-point-bias factor may have a cost function as given by the following equation:

$$\text{cost}_1(t, i) = \|T_w^y(t) * P^w(t) - (P^y(t) + (0, (\text{bias})_i, 0))\|, \qquad \text{Equation (1)}$$

where $T_w^y(t)$ is the inverse of the pose values $(X_i, Y_i, Z_i, \phi_i, \theta_i, \psi_i)$ of the pose node connected to the pose-point-bias factor at time t, $P^w(t)$ is a location value $(X_i, Y_i, Z_i)$ stored within the pose-point-bias factor at time t, $P^y(t)$ is the keypoint location value $(x_i, y_i, z_i)$ of the point node connected to the pose-point-bias factor at time t, and $(\text{bias})_1$ is the floating-point value of the ith bias node connected to the pose-point-bias factor. In view of Equation (1), as each bias node is connected to N pose-point-bias factors, each bias

US 12,565,217 B2

9 node may be associated with N $\text{cost}_1(t, i)$ functions relating to those N pose-point-bias factors. Accordingly, for the ith bias node and its associated N $\text{cost}_1(t, i)$ functions, the values of time t given the value i of may correspond to $t_{i*N}, \ldots, t_{i*N+N-1}$.

In addition to the N pose-point-bias factors connecting N successive pairs of pose nodes and point nodes to a bias node, each bias node may be connected in sequence via a bias-to-bias factor. For example, as shown in FIG. 4 bias node 430A may be connected to bias node 430B via bias-to-bias factor 435AB; bias node 430B may be connected to bias node 430C (not shown) via bias-to-bias factor 435BC; and so on. Each bias-to-bias factor may have a cost function as given by the following equation:

$$\text{cost}_2(i) = |(\text{bias})_{i+1} - (\text{bias})_i|, \qquad \text{Equation (2)}$$

where $(\text{bias})_i$ is the floating-point value of the bias node preceding the bias-to-bias factor (e.g., bias node 430A with respect to bias-to-bias factor 435AB); and $(\text{bias})_{i+1}$ is the floating-point value of the bias node following the bias-to-bias factor (e.g., bias node 430B with respect to bias-to-bias factor 435AB).

In addition to any pose-point-bias factors or bias-to-bias factors, each bias node may also be connected to a bias-prior factor. For example, as shown in FIG. 4 bias node 430A may be connected to bias-prior factor 440A; bias node 430B may be connected to bias-prior factor 440B; and so on. Each bias-prior factor may have a cost function as given by the following equation:

$$\text{cost}_3(i) = |(\text{prior})_i - (\text{bias})_i|, \qquad \text{Equation (3)}$$

where $(\text{bias})_i$ is the floating-point value of the ith bias node connected to the ith bias-prior factor and $(\text{prior})_i$ is a floating-point value stored in the ith bias-prior factor.

After initialization command module 230 may perform factor graph optimization by minimizing the following equation:

$$\operatorname*{argmin}_i \sum_i \sum_{t=i*N}^{i*N+N-1} ((\text{cost}_1(t, i)) + (\text{cost}_2(i)) + (\text{cost}_3(i))). \quad \text{Equation (4)}$$

In various embodiments, Equation (4) may be optimized using a Gauss-Newton algorithm, a Levenberg-Marquardt algorithm, or other optimization methods for factor graphs as known in the art.

Upon completion of the factor graph optimization, command module 230 may correct the keypoint locations by subtracting the y-component within the ith bias node from $y_i$. For example, given the keypoint location of $(x_i, y_i, z_i)$, command module 230 may generate a corrected keypoint location of $(x_i, y_i-(\text{bias}_y)_i, z_i)$. After determining the corrected keypoint locations for a probe segment, command module 230 may then generate a corrected probe segment for further processing into maps.

Figure 6:
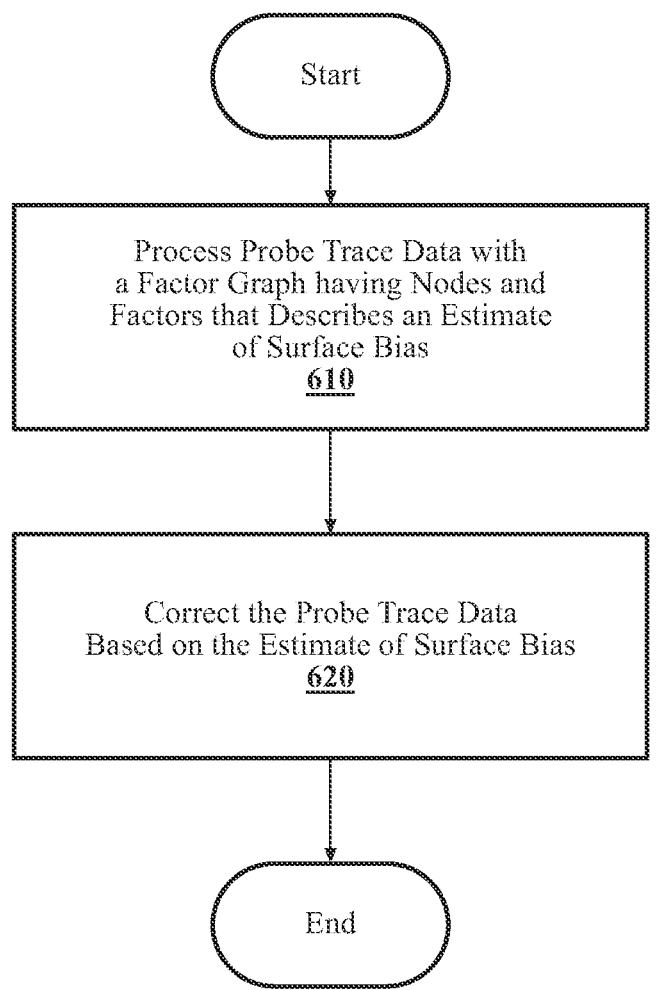
FIG. 6 illustrates one example of a method for implementing surface bias estimation strategies.

FIG. 6 illustrates a flowchart of a method 600 that is associated with implementing surface bias estimation strategies. Method 600 will be discussed from the perspective of the surface bias estimation system 170 of FIGS. 1 and 2. While method 600 is discussed in combination with the surface bias estimation system 170, it should be appreciated that the method 600 is not limited to being implemented within surface bias estimation system 170 but is instead one example of a system that may implement method 600.

At 610, command module 230 may process probe trace data with a factor graph having nodes and factors that describes an estimate of surface bias. For example, the probe data may be analyzed to find a sequence of keypoints running alongside a vehicle trajectory within a specified distance. Based on a tunable bias parameter, which may be pre-determined or selected by command module 230, a set of bias nodes may be constructed and connected in sequence via a set of bias-to-bias factors. In addition, each bias node may be further connected to a subset of post-point-bias factors, where each subset has a size equal to the value of the tunable bias parameter and where each pose-point-bias factor is connected to a pose node and a point node. In some embodiments, each bias node may also be connected to a bias-prior factor.

As described herein, the nodes and factors of the factor graph may be initialized, then optimized using a Gauss-Newton algorithm, a Levenberg-Marquardt algorithm, or other optimization methods for factor graphs as known in the art to obtain an estimate of surface bias. In some embodiments, the estimate of surface bias may be composed of a sequence of values, such as the values of the bias nodes. In further embodiments, the estimate of the surface bias may be adjusted by the values of each bias-prior factor attached to each bias node. In various embodiments, the estimate of surface bias may be obtained by applying a function (e.g., average, mean) to the sequence of values.

At 620, command module 230 may correct the probe trace data based on the estimate of surface bias. For example, each keypoint of the probe trace used in the analysis described in step 610 may be adjusted by the estimate of surface bias. For example, for each keypoint location of $(x_i, y_i, z_i)$, command module 230 may generate a corrected keypoint location of $(x_i, y_i-(\text{bias\_correction})_i, z_i)$, where $(\text{bias\_correction})_i$ may be the ith value of the y-component of the estimate of the surface bias (e.g., $(\text{bias}_y)_i$). In some embodiments, $(\text{bias\_correction})_i$ may be the same for each keypoint location, such as where a function (e.g., average) has been applied to a sequence of values representing the estimate of surface bias.

Once corrected probe trace data is obtained, command module 230 may display the corrected probe trace data, such as in a map. In some embodiments, command module 230 may send the corrected probe trace data to a vehicle or a server, where the message upon receipt instructs the vehicle or server to update a map with the corrected probe trace data.

FIG. 1 will now be discussed in full detail as an example environment within which the system and methods disclosed herein may operate. In some instances, vehicle 100 is configured to switch selectively between various modes, such as an autonomous mode, one or more semi-autonomous operational modes, a manual mode, etc. Such switching may be implemented in a suitable manner, now known, or later developed. "Manual mode" means that all of or a majority of the navigation/maneuvering of the vehicle is performed according to inputs received from a user (e.g., human driver). In one or more arrangements, vehicle 100 may be a conventional vehicle that is configured to operate in only a manual mode.

In one or more embodiments, vehicle 100 is an autonomous vehicle. As used herein, "autonomous vehicle" refers to a vehicle that operates in an autonomous mode. "Autonomous mode" refers to using one or more computing systems to control vehicle 100, such as providing navigation/maneuvering of vehicle 100 along a travel route, with minimal or no input from a human driver. In one or more embodiments, vehicle 100 is either highly automated or completely automated. In one embodiment, vehicle 100 is configured with one or more semi-autonomous operational modes in which one or more computing systems perform a portion of the navigation/maneuvering of the vehicle along a travel route, and a vehicle operator (i.e., driver) provides inputs to the vehicle to perform a portion of the navigation/maneuvering of vehicle 100 along a travel route.

Vehicle 100 may include one or more processors 110. In one or more arrangements, processor(s) 110 may be a main processor of vehicle 100. For instance, processor(s) 110 may be an electronic control unit (ECU). Vehicle 100 may include one or more data stores 115 for storing one or more types of data. Data store(s) 115 may include volatile memory, non-volatile memory, or both. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. Data store(s) 115 may be a component of processor(s) 110, or data store 115 may be operatively connected to processor(s) 110 for use thereby. The term "operatively connected," as used throughout this description, may include direct or indirect connections, including connections without direct physical contact.

In one or more arrangements, data store(s) 115 may include map data 116. Map data 116 may include maps of one or more geographic areas. In some instances, map data 116 may include information or data on roads, traffic control devices, road markings, structures, features, landmarks, or any combination thereof in the one or more geographic areas. Map data 116 may be in any suitable form. In some instances, map data 116 may include aerial views of an area. In some instances, map data 116 may include ground views of an area, including 360-degree ground views. Map data 116 may include measurements, dimensions, distances, information, or any combination thereof for one or more items included in map data 116. Map data 116 may also include measurements, dimensions, distances, information, or any combination thereof relative to other items included in map data 116. Map data 116 may include a digital map with information about road geometry. Map data 116 may be high quality, highly detailed, or both.

In one or more arrangements, map data 116 may include one or more terrain maps 117. Terrain map(s) 117 may include information about the ground, terrain, roads, surfaces, other features, or any combination thereof of one or more geographic areas. Terrain map(s) 117 may include elevation data in the one or more geographic areas. Terrain map(s) 117 may be high quality, highly detailed, or both. Terrain map(s) 117 may define one or more ground surfaces, which may include paved roads, unpaved roads, land, and other things that define a ground surface.

In one or more arrangements, map data 116 may include one or more static obstacle maps 118. Static obstacle map(s) 118 may include information about one or more static obstacles located within one or more geographic areas. A "static obstacle" is a physical object whose position does not change or substantially change over a period of time and whose size does not change or substantially change over a period of time. Examples of static obstacles include trees, buildings, curbs, fences, railings, medians, utility poles, statues, monuments, signs, benches, furniture, mailboxes, large rocks, hills. The static obstacles may be objects that extend above ground level. The one or more static obstacles included in static obstacle map(s) 118 may have location data, size data, dimension data, material data, other data, or any combination thereof, associated with it. Static obstacle map(s) 118 may include measurements, dimensions, distances, information, or any combination thereof for one or more static obstacles. Static obstacle map(s) 118 may be high quality, highly detailed, or both. Static obstacle map(s) 118 may be updated to reflect changes within a mapped area.

Data store(s) 115 may include sensor data 119. In this context, "sensor data" means any information about the sensors that vehicle 100 is equipped with, including the capabilities and other information about such sensors. As will be explained below, vehicle 100 may include sensor system 120. Sensor data 119 may relate to one or more sensors of sensor system 120. As an example, in one or more arrangements, sensor data 119 may include information on one or more LIDAR sensors 124 of sensor system 120.

In some instances, at least a portion of map data 116 or sensor data 119 may be located in data stores(s) 115 located onboard vehicle 100. Alternatively, or in addition, at least a portion of map data 116 or sensor data 119 may be located in data stores(s) 115 that are located remotely from vehicle 100.

As noted above, vehicle 100 may include sensor system 120. Sensor system 120 may include one or more sensors. "Sensor" means any device, component, or system that may detect or sense something. The one or more sensors may be configured to sense, detect, or perform both in real-time. As used herein, the term "real-time" means a level of processing responsiveness that a user or system senses as sufficiently immediate for a particular process or determination to be made, or that enables the processor to keep up with some external process.

In arrangements in which sensor system 120 includes a plurality of sensors, the sensors may work independently from each other. Alternatively, two or more of the sensors may work in combination with each other. In such an embodiment, the two or more sensors may form a sensor network. Sensor system 120, the one or more sensors, or both may be operatively connected to processor(s) 110, data store(s) 115, another element of vehicle 100 (including any of the elements shown in FIG. 1), or any combination thereof. Sensor system 120 may acquire data of at least a portion of the external environment of vehicle 100 (e.g., nearby vehicles).

Sensor system 120 may include any suitable type of sensor. Various examples of different types of sensors will be described herein. However, it will be understood that the embodiments are not limited to the particular sensors described. Sensor system 120 may include one or more vehicle sensors 121. Vehicle sensor(s) 121 may detect, determine, sense, or acquire in a combination thereof information about vehicle 100 itself. In one or more arrangements, vehicle sensor(s) 121 may be configured to detect, sense, or acquire in a combination thereof position and orientation changes of vehicle 100, such as, for example, based on inertial acceleration. In one or more arrangements, vehicle sensor(s) 121 may include one or more accelerometers, one or more gyroscopes, an inertial measurement unit (IMU), a dead-reckoning system, a global navigation satellite system (GNSS), a global positioning system (GPS), a navigation system 147, other suitable sensors, or any combination thereof. Vehicle sensor(s) 121 may be configured to detect, sense, or acquire in a combination thereof one or more characteristics of vehicle 100. In one or more arrangements, vehicle sensor(s) 121 may include a speedometer to determine a current speed of vehicle 100.

Alternatively, or in addition, sensor system 120 may include one or more environment sensors 122 configured to acquire, sense, or acquire in a combination thereof driving environment data. "Driving environment data" includes data or information about the external environment in which an autonomous vehicle is located or one or more portions thereof. For example, environment sensor(s) 122 may be configured to detect, quantify, sense, or acquire in any combination thereof obstacles in at least a portion of the external environment of vehicle 100, information/data about such obstacles, or a combination thereof. Such obstacles may be comprised of stationary objects, dynamic objects, or a combination thereof. Environment sensor(s) 122 may be configured to detect, measure, quantify, sense, or acquire in any combination thereof other things in the external environment of vehicle 100, such as, for example, lane markers, signs, traffic lights, traffic signs, lane lines, crosswalks, curbs proximate to vehicle 100, off-road objects, etc.

Various examples of sensors of sensor system 120 will be described herein. The example sensors may be part of the one or more environment sensor(s) 122, the one or more vehicle sensors 121, or both. However, it will be understood that the embodiments are not limited to the particular sensors described.

As an example, in one or more arrangements, sensor system 120 may include one or more radar sensors 123, one or more LIDAR sensors 124, one or more sonar sensors 125, one or more cameras 126, or any combination thereof. In one or more arrangements, camera(s) 126 may be high dynamic range (HDR) cameras or infrared (IR) cameras.

Vehicle 100 may include an input system 130. An "input system" includes any device, component, system, element or arrangement or groups thereof that enable information/data to be entered into a machine. Input system 130 may receive an input from a vehicle passenger (e.g., a driver or a passenger). Vehicle 100 may include an output system 135. An "output system" includes any device, component, or arrangement or groups thereof that enable information/data to be presented to a vehicle passenger (e.g., a person, a vehicle passenger, etc.).

Vehicle 100 may include one or more vehicle systems 140. Various examples of vehicle system(s) 140 are shown in FIG. 1. However, vehicle 100 may include more, fewer, or different vehicle systems. It should be appreciated that although particular vehicle systems are separately defined, each or any of the systems or portions thereof may be otherwise combined or segregated via hardware, software, or a combination thereof within vehicle 100. Vehicle 100 may include a propulsion system 141, a braking system 142, a steering system 143, throttle system 144, a transmission system 145, a signaling system 146, a navigation system 147, other systems, or any combination thereof. Each of these systems may include one or more devices, components, or combinations thereof, now known or later developed.

Navigation system 147 may include one or more devices, applications, or combinations thereof, now known or later developed, configured to determine the geographic location of the vehicle 100, to determine a travel route for vehicle 100, or to determine both. Navigation system 147 may include one or more mapping applications to determine a travel route for vehicle 100. Navigation system 147 may include a global positioning system, a local positioning system, a geolocation system, or any combination thereof.

Processor(s) 110, surface bias estimation system 170, automated driving module(s) 160, or any combination thereof may be operatively connected to communicate with various aspects of vehicle system(s) 140 or individual components thereof. For example, returning to FIG. 1, processor(s) 110, automated driving module(s) 160, or a combination thereof may be in communication to send or receive information from various aspects of vehicle system(s) 140 to control the movement, speed, maneuvering, heading, direction, etc. of vehicle 100. Processor(s) 110, surface bias estimation system 170, automated driving module(s) 160, or any combination thereof may control some or all of these vehicle system(s) 140 and, thus, may be partially or fully autonomous.

Processor(s) 110, surface bias estimation system 170, automated driving module(s) 160, or any combination thereof may be operable to control at least one of the navigation or maneuvering of vehicle 100 by controlling one or more of vehicle systems 140 or components thereof. For instance, when operating in an autonomous mode, processor(s) 110, surface bias estimation system 170, automated driving module(s) 160, or any combination thereof may control the direction, speed, or both of vehicle 100. Processor(s) 110, surface bias estimation system 170, automated driving module(s) 160, or any combination thereof may cause vehicle 100 to accelerate (e.g., by increasing the supply of fuel provided to the engine), decelerate (e.g., by decreasing the supply of fuel to the engine, by applying brakes), change direction (e.g., by turning the front two wheels), or perform any combination thereof. As used herein, "cause" or "causing" means to make, force, compel, direct, command, instruct, enable, or in any combination thereof an event or action to occur or at least be in a state where such event or action may occur, either in a direct or indirect manner.

Vehicle 100 may include one or more actuators 150. Actuator(s) 150 may be any element or combination of elements operable to modify, adjust, alter, or in any combination thereof one or more of vehicle systems 140 or components thereof to responsive to receiving signals or other inputs from processor(s) 110, automated driving module(s) 160, or a combination thereof. Any suitable actuator may be used. For instance, actuator(s) 150 may include motors, pneumatic actuators, hydraulic pistons, relays, solenoids, and piezoelectric actuators, just to name a few possibilities.

Vehicle 100 may include one or more modules, at least some of which are described herein. The modules may be implemented as computer-readable program code that, when executed by processor(s) 110, implement one or more of the various processes described herein. One or more of the modules may be a component of processor(s) 110, or one or more of the modules may be executed on or distributed among other processing systems to which processor(s) 110 is operatively connected. The modules may include instructions (e.g., program logic) executable by processor(s) 110. Alternatively, or in addition, data store(s) 115 may contain such instructions.

In one or more arrangements, one or more of the modules described herein may include artificial or computational intelligence elements, e.g., neural network, fuzzy logic, or other machine learning algorithms. Further, in one or more arrangements, one or more of the modules may be distributed among a plurality of the modules described herein. In one or more arrangements, two or more of the modules described herein may be combined into a single module.

Vehicle 100 may include one or more autonomous driving modules 160. Automated driving module(s) 160 may be configured to receive data from sensor system 120 or any other type of system capable of capturing information relating to vehicle 100, the external environment of the vehicle 100, or a combination thereof. In one or more arrangements, automated driving module(s) 160 may use such data to generate one or more driving scene models. Automated driving module(s) 160 may determine position and velocity of vehicle 100. Automated driving module(s) 160 may determine the location of obstacles, obstacles, or other environmental features including traffic signs, trees, shrubs, neighboring vehicles, pedestrians, etc.

Automated driving module(s) 160 may be configured to receive, determine, or in a combination thereof location information for obstacles within the external environment of vehicle 100, which may be used by processor(s) 110, one or more of the modules described herein, or any combination thereof to estimate: a position or orientation of vehicle 100; a vehicle position or orientation in global coordinates based on signals from a plurality of satellites or other geolocation systems; or any other data/signals that could be used to determine a position or orientation of vehicle 100 with respect to its environment for use in either creating a map or determining the position of vehicle 100 in respect to map data.

Automated driving module(s) 160 either independently or in combination with surface bias estimation system 170 may be configured to determine travel path(s), current autonomous driving maneuvers for vehicle 100, future autonomous driving maneuvers, modifications to current autonomous driving maneuvers, etc. Such determinations by automated driving module(s) 160 may be based on data acquired by sensor system 120, driving scene models, data from any other suitable source such as determinations from sensor data 250, or any combination thereof. In general, automated driving module(s) 160 may function to implement different levels of automation, including advanced driving assistance (ADAS) functions, semi-autonomous functions, and fully autonomous functions. "Driving maneuver" means one or more actions that affect the movement of a vehicle. Examples of driving maneuvers include accelerating, decelerating, braking, turning, moving in a lateral direction of vehicle 100, changing travel lanes, merging into a travel lane, and reversing, just to name a few possibilities. Automated driving module(s) 160 may be configured to implement driving maneuvers. Automated driving module(s) 160 may cause, directly or indirectly, such autonomous driving maneuvers to be implemented. As used herein, "cause" or "causing" means to make, command, instruct, enable, or in any combination thereof an event or action to occur or at least be in a state where such event or action may occur, either in a direct or indirect manner. Automated driving module(s) 160 may be configured to execute various vehicle functions, whether individually or in combination, to transmit data to, receive data from, interact with, or to control vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, or processes described above may be realized in hardware or a combination of hardware and software and may be realized in a centralized fashion in one processing system or in a distributed fashion where different elements are spread across several interconnected processing systems. Any kind of processing system or another apparatus adapted for carrying out the methods described herein is suited. A typical combination of hardware and software may be a processing system with computer-usable program code that, when being loaded and executed, controls the processing system such that it carries out the methods described herein. The systems, components, or processes also may be embedded in a computer-readable storage, such as a computer program product or other data programs storage device, readable by a machine, tangibly embodying a program of instructions executable by the machine to perform methods and processes described herein. These elements also may be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that may contain or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++, or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein may be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory communicably coupled to the processor and storing machine-readable instructions that, when executed by the processor, cause the processor to:
receive probe trace data from vehicle sensors;
process probe trace data with a factor graph having nodes and factors that describe an estimate of cross-slope surface bias;
correct the probe trace data based on the estimate of cross-slope surface bias; and
update map data in a vehicle to include an object based on the corrected probe trace data.

2. The system of claim 1, wherein the machine-readable instructions further includes an instruction that, when executed by the processor, causes the processor to construct the factor graph with a set of bias nodes and a set of bias-to-bias factors, wherein each bias node of the set of bias nodes is connected to another bias node in the set of bias nodes via a bias-to-bias factor within the set of bias-to-bias factors.

3. The system of claim 2, wherein the machine-readable instruction to construct the factor graph further incorporates a set of pose-point-bias factors and wherein each bias node of the set of bias nodes is further connected to a subset of pose-point-bias factors within the set of pose-point-bias factors, and wherein each subset of pose-point-bias factors within the set of pose-point-bias factors is equal in size to a tunable bias parameter value.

4. The system of claim 3, wherein the machine-readable instruction to construct the factor graph further incorporates a set of pose nodes and a set of point nodes and wherein each pose-point-bias factor of the set of pose-point-bias factors is further connected to a pose node within the set of pose nodes and a point node within the set of point nodes.

5. The system of claim 4, wherein the machine-readable instruction to construct the factor graph further incorporates a set of bias-prior factors and wherein each bias node of the set of bias nodes is connected to a bias-prior factor.

6. The system of claim 1, wherein the machine-readable instructions further includes an instruction that, when executed by the processor, causes the processor to send a message containing corrected probe trace data to a server, where the message upon receipt instructs the server to update a server map to include the object.

7. The system of claim 1, wherein the machine-readable instructions further includes an instruction that, when executed by the processor, causes the processor to display display the object in the vehicle based on the map data.

8. A non-transitory computer-readable medium including instructions that when executed by one or more processors cause the one or more processors to:
receive probe trace data from vehicle sensors;
process probe trace data with a factor graph having nodes and factors that describe an estimate of cross-slope surface bias;
correct the probe trace data based on the estimate of cross-slope surface bias; and
update map data in a vehicle to include an object based on the corrected probe trace data.

9. The non-transitory computer-readable medium of claim 8, wherein the instructions further includes an instruction to construct the factor graph with a set of bias nodes and a set of bias-to-bias factors, wherein each bias node of the set of bias nodes is connected to another bias node in the set of bias nodes via a bias-to-bias factor within the set of bias-to-bias factors.

10. The non-transitory computer-readable medium of claim 9, wherein the instruction to construct the factor graph further incorporates a set of pose-point-bias factors and wherein each bias node of the set of bias nodes is further connected to a subset of pose-point-bias factors within the set of pose-point-bias factors, and wherein each subset of pose-point-bias factors within the set of pose-point-bias factors is equal in size to a tunable bias parameter value.

11. The non-transitory computer-readable medium of claim 10, wherein the instruction to construct the factor graph further incorporates a set of pose nodes and a set of point nodes and wherein each pose-point-bias factor of the set of pose-point-bias factors is further connected to a pose node within the set of pose nodes and a point node within the set of point nodes.

12. The non-transitory computer-readable medium of claim 11, wherein the instruction to construct the factor graph further incorporates a set of bias-prior factors and wherein each bias node of the set of bias nodes is connected to a bias-prior factor.

13. The non-transitory computer-readable medium of claim 8, wherein the instructions further includes an instruction to display the object in the vehicle based on the map data.

14. A method, comprising:

receiving probe trace data from vehicle sensors;

processing probe trace data with a factor graph having nodes and factors that describe an estimate of cross-slope surface bias;

correcting the probe trace data based on the estimate of cross-slope surface bias; and updating map data in a vehicle to include an object based on the corrected probe trace data.

15. The method of claim 14, further comprising the step of constructing the factor graph with a set of bias nodes and a set of bias-to-bias factors, wherein each bias node of the set of bias nodes is connected to another bias node in the set of bias nodes via a bias-to-bias factor within the set of bias-to-bias factors.

16. The method of claim 15, wherein the step of constructing the factor graph further incorporates a set of pose-point-bias factors and wherein each bias node of the set of bias nodes is further connected to a subset of pose-point-bias factors within the set of pose-point-bias factors, and wherein each subset of pose-point-bias factors within the set of pose-point-bias factors is equal in size to a tunable bias parameter value.

17. The method of claim 16, wherein the step of constructing the factor graph further incorporates a set of pose nodes and a set of point nodes and wherein each pose-point-bias factor of the set of pose-point-bias factors is further connected to a pose node within the set of pose nodes and a point node within the set of point nodes.

18. The method of claim 17, wherein the step of constructing the factor graph further incorporates a set of bias-prior factors and wherein each bias node of the set of bias nodes is connected to a bias-prior factor.

19. The method of claim 14, further comprising sending a message containing corrected probe trace data to a server, where the message upon receipt instructs the server to update a server map to include the object.

20. The method of claim 14, further comprising displaying display the object in the vehicle based on the map data.

\* \* \* \* \*